United States Patent
Puon et al.

(10) Patent No.: US 7,554,994 B1
(45) Date of Patent: Jun. 30, 2009

(54) INTEGRATED ROUTER SWITCH CONTAINING MECHANISM FOR AUTOMATICALLY CREATING IEEE 802.1Q VLAN TRUNKS FOR LAN-TO-WAN CONNECTIVITY

(75) Inventors: Roberto Corzo Puon, Madison, AL (US); Amy Joan Puon, legal representative, Madison, AL (US); Timothy James Schlichter, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 570 days.

(21) Appl. No.: 10/990,697

(22) Filed: Nov. 17, 2004

(51) Int. Cl.
  *H04L 12/56* (2006.01)
(52) U.S. Cl. .................. 370/401; 370/389; 370/395.5; 370/469
(58) Field of Classification Search ............... 370/389, 370/395.5, 401, 469
  See application file for complete search history.

(56) References Cited

U.S. PATENT DOCUMENTS

| | | | |
|---|---|---|---|
| 5,588,003 A | 12/1996 | Ohba et al. | 370/468 |
| 5,968,126 A * | 10/1999 | Ekstrom et al. | 709/225 |
| 6,167,052 A * | 12/2000 | McNeill et al. | 370/399 |
| 6,658,457 B2 | 12/2003 | Nishikawa et al. | 709/206 |
| 2002/0086705 A1 | 7/2002 | Yokoyama | 455/560 |
| 2003/0081625 A1 * | 5/2003 | Matsufuru | 370/412 |
| 2003/0223378 A1 | 12/2003 | Ishwar et al. | 370/254 |
| 2004/0218554 A1 | 11/2004 | Saint Etienne et al. | 370/276 |
| 2004/0252722 A1 * | 12/2004 | Wybenga et al. | 370/474 |
| 2005/0073963 A1 * | 4/2005 | Goodfellow et al. | 370/255 |
| 2006/0050719 A1 | 3/2006 | Barr et al. | 370/401 |
| 2006/0095968 A1 | 5/2006 | Portolani et al. | 726/23 |
| 2006/0143300 A1 | 6/2006 | See et al. | 709/227 |

OTHER PUBLICATIONS

Parkhurst, William R. —Cisco OSPF Command and Configuration Handbook—Cisco Press 2002, p. 83, 84, and 97.

* cited by examiner

*Primary Examiner*—William Trost, IV
*Assistant Examiner*—Toan D Nguyen
(74) *Attorney, Agent, or Firm*—Allen, Dyer, Doppelt, Milbrath & Gilchrist, P.A.

(57) ABSTRACT

An integrated processor-controlled router and switch fabric architecture provides connectivity between local area network (LAN) ports serving a plurality of local area network users and a wide area network (WAN) port that provides connectivity with the internet. IEEE 802.1Q virtual local area network (VLAN) trunks are automatically created by the processor in response to a reduced set of command inputs. No user-configurable physical link exists between the switch fabric and the router. Instead, a virtual IEEE 802.1Q trunk is created through software to provide connectivity between the switch fabric and the router's control processor.

5 Claims, 3 Drawing Sheets

INTEGRATED ROUTER SWITCH CONTAINING MECHANISM FOR AUTOMATICALLY CREATING IEEE 802.1Q VLAN TRUNKS FOR LAN-TO-WAN CONNECTIVITY

FIELD OF THE INVENTION

The present invention relates in general to telecommunication systems and subsystems thereof, and is particularly directed to an integrated router and switch fabric architecture, through which connectivity is provided between local area network (LAN) ports serving a plurality of local area network users and a wide area network (WAN) port that provides connectivity with the internet, by the control processor automatically creating IEEE 802.1Q virtual local area network (VLAN) trunks in response to a reduced set of command inputs from a user.

BACKGROUND OF THE INVENTION

FIG. 1 is a reduced complexity block diagram of a conventional system architecture for providing connectivity between a plurality of user terminals of a local area network and the internet. As shown therein, a plurality of end user communication terminals 110 are connected to associated ports 121 of an Ethernet-based distribution switch 120, which is typically configured as a managed layer two Ethernet switch, and is coupled to a processor (CPU 125)-controlled switch fabric chip 130 (such as a Broadcom BCM5645 Strataswitch) within a managed Ethernet switch subsystem 100. In the WAN direction, the switch fabric chip 130 is further coupled to an Ethernet port 140, which is coupled over a communication link 150 (configured as an IEEE 802.1Q trunk link) to an associated Ethernet port 201 of a layer three edge router subsystem 200.

Within the router subsystem 200, Ethernet port 201 is coupled to the router's communication control processor chip (CPU) 210 (such as a Freescale MPC866) which, in turn, is coupled to a wide area network port 220, that provides a digital communication interface to the internet 230, and to a dial back-up unit 240, that provides auxiliary connectivity to public switched telephone network 250.

Although the block diagram of FIG. 1 depicts only four user terminals 110 connected to the Ethernet-based distribution switch 120, it will be realized that in actuality the number of user terminals can expected to be in the thousands; only four are shown in order to reduce the complexity of the drawings. In order to handle data traffic among a large number of user terminals, advantage is taken of the ability of the managed layer two Ethernet distribution switch 120 to subdivide the LAN into multiple virtual LANs (VLANs), which increases the efficiency of the network by reducing the broadcast traffic load, as each VLAN provides virtual isolation of traffic between itself and other VLANs. Once traffic intended for the internet leaves a VLAN, it is the task of the layer three edge router subsystem to route the traffic from the VLAN to the WAN.

As shown in FIG. 1 and as described above, the managed Ethernet switch subsystem 100 and the edge router subsystem 200 are isolated subsystems that are tied together by way of an IEEE 802.1Q VLAN trunk, which is the physical link that transports information from multi VLANs to the WAN and vice versa. In accordance with the communication protocol employed by the system, each frame traversing the trunk has a VLAN tag prepended to the frame, so that traffic from one VLAN is distinguishable from traffic from all other VLANs.

In the conventional system of the type shown in FIG. 1, the user (system manager) is required to configure the VLAN trunk on both sides of the link 150 before traffic can flow from each VLAN to the WAN. This is a time-consuming and tedious task, that is prone to errors, particularly as the number of user terminals and VLANs increases.

SUMMARY OF THE INVENTION

In accordance with the present invention, drawbacks of conventional segregated router-managed switch systems of the type described above are effectively obviated by an integrated router and switch fabric architecture, through which connectivity is provided between local area network (LAN) ports serving a plurality of local area network users and a wide area network (WAN) port that provides connectivity with the internet, by automatically creating IEEE 802.1Q virtual local area network (VLAN) trunks in response to a reduced set of command inputs. As will be described, the integrated router and switch fabric architecture of the present invention has two essential aspects that differentiate it from the prior art. The first is the fact that it has no user-configurable physical link between the switch fabric and the router. Instead, a virtual IEEE 802.1Q trunk is created through software to provide connectivity between the switch fabric and the router's control processor. Secondly, this virtual IEEE 802.1Q trunk is automatically generated by the router's control processor when a VLAN interface is created, by the user initiating the configuration of a LAN-to-WAN connection from a particular VLAN. All traffic flowing over this link have VLAN tags appended to the frames as defined in accordance with IEEE 802.1Q protocol.

DETAILED DESCRIPTION

Figure 1:
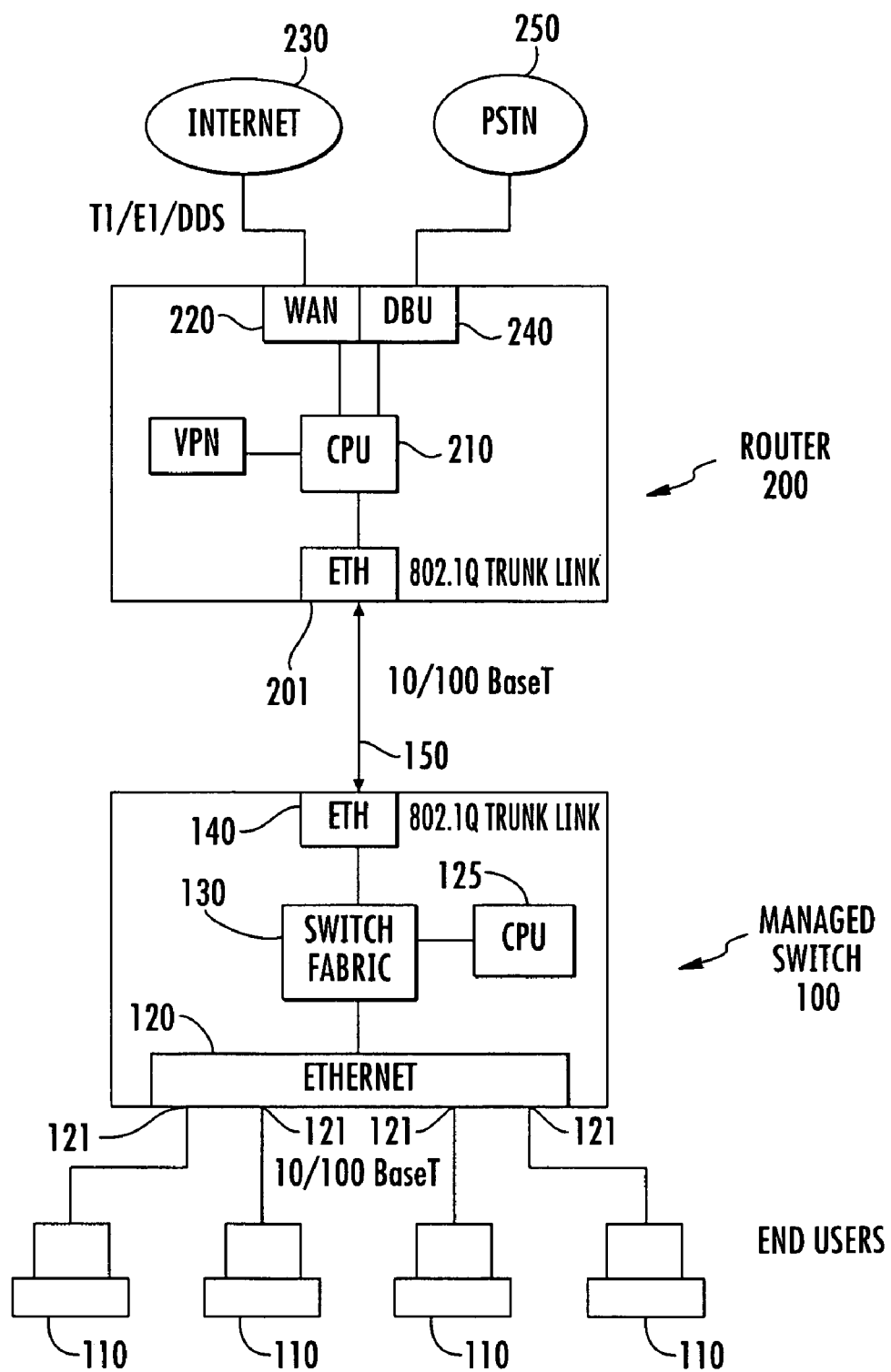
FIG. 1 is a reduced complexity block diagram of a conventional system architecture for providing connectivity between a plurality of user terminals of a local area network and the internet.

Before detailing the integrated switch fabric-router system architecture of the present invention, it should be observed that the invention resides primarily in a prescribed novel arrangement of conventional digital communication chip sets and control software therefor, through which a virtual IEEE 802.1Q VLAN trunk is automatically created by the router control processor by relatively reduced complexity input commands from the user, who no longer has to configure the Ethernet ports as in the case of the segregated router and switch fabric subsystems of FIG. 1. Consequently, the configurations of such chip sets and the manner in which they may be interfaced with conventional communication interface components and circuits have, for the most part, been shown in the drawings by readily understandable schematic block diagrams, and an associated state diagram, which show only those specific aspects that are pertinent to the present invention, so as not to obscure the disclosure with details which will be readily apparent to those skilled in the art having the benefit of the description herein. Thus, the block diagram of FIG. 2 is primarily intended to show major components of an embodiment of the invention in a convenient functional grouping, while FIG. 3 is an associated state diagram depicting the operation of the system whereby the present invention may be more readily understood.

Figure 2:
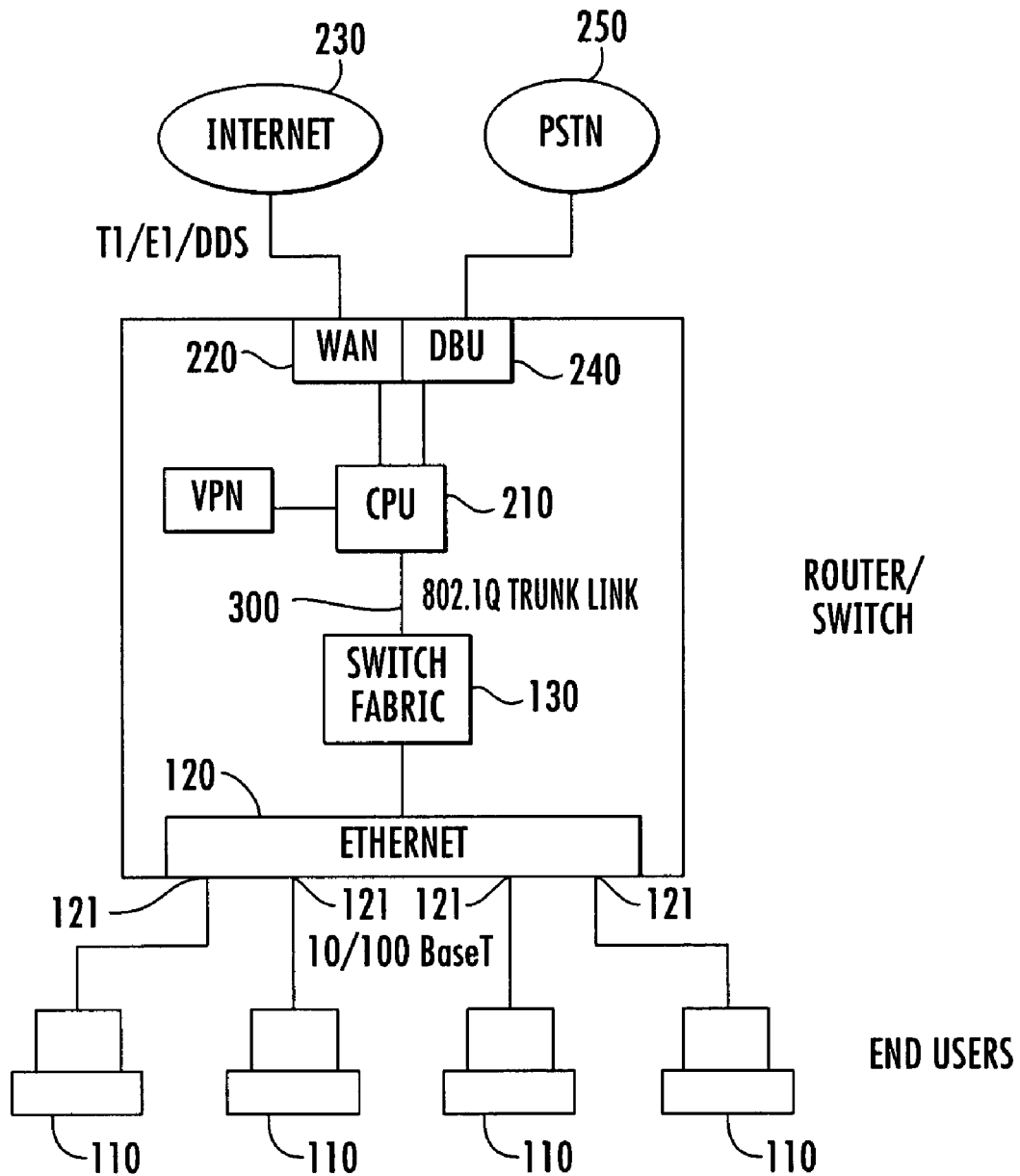
FIG. 2 is a reduced complexity block diagram of an integrated switch fabric-router system architecture in accordance with the present invention.
Figure 3:
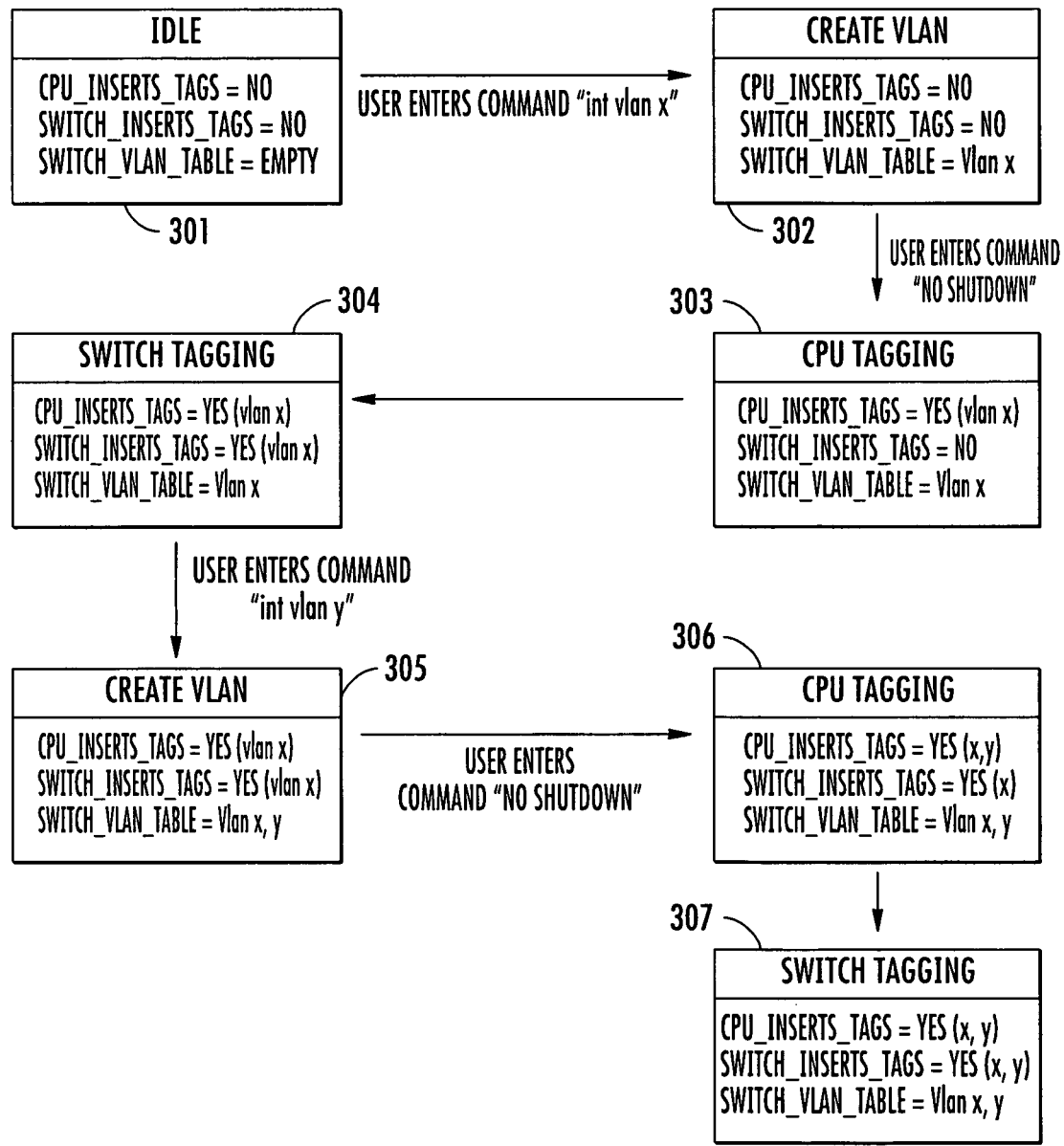
FIG. 3 is a state diagram shown the manner in which IEEE 802.1Q trunks are automatically created in response to prescribed user inputs in accordance with the present invention.

Attention is now directed to FIG. 2, which is a reduced complexity block diagram of an integrated switch fabric/router system architecture pursuant to the present invention. As shown therein, as in the segregated system architecture of FIG. 1, the integrated system architecture of FIG. 2 contains a (managed layer two) Ethernet-based distribution switch 120, for providing connectivity between a plurality of user communication terminals 110 of a local area network and a switch fabric chip 130. As in the system diagram of FIG. 1, only four user terminals 110 are shown in FIG. 2, in order to reduce the complexity of the drawings, it being understood that in actuality the number of user terminals can expected to be in the thousands. As in the architecture of FIG. 1, switch fabric chip 130 may comprise a Broadcom BCM5645 Strataswitch.

In accordance with the present invention, rather than being connected to a user configurable Ethernet port through which access to a dedicated physical link to a further user configurable Ethernet port in a separate router subsystem is afforded, the switch fabric chip 130 is coupled to a PCI bus 300 within the router/switch unit, through which communications with communication control processor chip (CPU) 210 are provided. As in the router subsystem 200 of FIG. 1, communication control processor chip 210 may comprise a Freescale MPC866. The communication control processor chip 210, in turn, is coupled to a wide area network port 220, that provides a digital communication interface to the internet 230, and to a dial back-up unit 240, that provides auxiliary connectivity to the public switched telephone network 250.

In addition, as in the system of FIG. 1, the managed layer two Ethernet distribution switch 120 is used to subdivide the LAN into multiple virtual LANs (VLANs), with each VLAN providing virtual isolation of traffic between itself and other VLANs. Once traffic intended for the internet leaves a VLAN, it is the job of the integrated switch fabric/router to route the traffic from the VLAN to the WAN.

As noted above, unlike the architecture of FIG. 1, the switch fabric chip 130 which provides access to the VLANs, and the control processor 210, which performs the function of the edge router, are not isolated subsystems that are tied together by way of an external user-configurable link. Instead, they are interfaced with each on the same motherboard with means of the PCI bus. Pursuant to the invention, an IEEE 802.1Q VLAN trunk link, that is functionally equivalent to the user-configured physical IEEE 802.1Q VLAN trunk link in the system of FIG. 1, is automatically created in response to the user issuing a prescribed set of commands to the communication control processor. The commands may be supplied in one of two ways: 1) through the web page; and 2) through a command line interface (CLI). The web page can be accessed from the WAN, the PSTN, or the LAN. The CLI can be accessed remotely via telnet (from the WAN, the PSTN, or the LAN). The CLI can also be directly accessed through a console port, which is a physical DB9 connector in the unit (not shown). The user commands and the responses they invoke are set forth in the state diagram example of FIG. 3, which shows the manner a SWITCH VLAN table is loaded with a pair of VLAN entries (x and y), and the CPU and SWITCH TAGGING states are loaded with tag entries supplied by the user.

Referring to FIG. 3, the system is initially in an IDLE state 301. In this state, a VLAN table that is maintained within the switch fabric chip 130 is empty, as shown by the variable: SWITCH_VLAN_TABLE=EMPTY, Consequently, as shown by the variable: SWITCH_INSERTS_TAGS=NO, the switch fabric chip is not tagging packets destined for the control processor chip 210; also, as shown by the variable: CPU_INSERTS_TAGS=NO, control processor chip 210 is not tagging packets destined for the switch fabric chip 130.

With the system in its idle state 301, the user proceeds to enter the command "int vlan x" (where x is the VLAN number of the Ethernet port of interest for a prescribed user terminal). In response to this command, the control processor transitions to the CREATE VLAN state 302. In this state, the VLAN table in the switch fabric is updated with the number of the new VLAN that has been created by the user input command. Since the user has supplied the identification of a VLAN, that VLAN number is written into the VLAN table maintained in the switch fabric chip, by the processor performing the function of the variable: SWITCH_VLAN_TABLE=Vlan x. Since the processor chip is not yet tagging packets, the variable CPU_INSERTS_TAGS=NO, and since the switch fabric is not yet tagging packets, the variable SWITCH_INSERTS_TAGS=NO.

Next, the user enters the command "no shutdown", which initiates CPU TAGGING state 303 and SWITCH TAGGING state 304. In particular, in the CPU TAGGING state 303, the processor begins tagging packets destined for the switch fabric with the particular VLAN number that was created by the user. Here, the processor inserts the tag information supplied to the tag table, as denoted by the variable: CPU_INSERTS_TAGS=YES (vlan x). Since switch fabric tagging has not yet begun, the variable SWITCH_INSERTS_TAGS=NO. From CREATE VLAN state 302, the variable SWITCH_VLAN_TABLE=Vlan x.

Next, in the SWITCH TAGGING state 304, the switch fabric begins tagging packets destined for the CPU with the particular VLAN number that has been supplied by the user. Thus, the variable: SWITCH_INSERTS_TAGS=YES (vlan x). Also, from the previous two states 302 and 303, the variable: CPU_INSERTS_TAGS=YES (vlan x) and the variable: SWITCH_VLAN_TABLE=Vlan x. Thus, with the variables of the CPU and SWITCH TAGGING states loaded with numerical Vlan identifications, traffic flowing between the control processor (CPU) and the switch fabric will have a VLAN tag appended to the frames as defined in IEEE 802.1Q. However, the process of performing the tagging and complying with IEEE 802.1Q has been accomplished without the user having to set all the variables. Loading of the requisite variables for the CPU and SWITCH tagging states has been performed automatically. Namely, the task of creating the IEEE 802.1Q VLAN trunk is no longer carried out by the user, but rather by the communication control processor.

In the present example of configuring a LAN-to-WAN connection for a pair of VLANs, as the completion of the SWITCH TAGGING state 304, the user enters a new vlan tag command having a new vlan number (y) as: "int vlan y, (where y is the VLAN number of the Ethernet port of interest for another prescribed user terminal). In response to this command, the control processor transitions to the next CREATE VLAN state 305. As was the case for state 302, in CREATE VLAN state 305, the VLAN table in the switch fabric is updated with the new VLAN number that has been created by the user command. In particular, the new VLAN number (y) is written into the VLAN table maintained in the switch fabric chip, by the processor performing the function of the variable: SWITCH_VLAN_TABLE=Vlan x, y. Since the processor chip has begun tagging packets, the variable CPU_INSERTS_TAGS=YES (vlan x), and the variable SWITCH_INSERTS_TAGS=YES (vlan x).

Next, the user again enters the command "no shutdown", which initiates CPU TAGGING state 306 and SWITCH TAGGING state 307. In CPU TAGGING state 306, the processor inserts the new tag information supplied to the tag table, as denoted by the variable: CPU_INSERTS_TAGS=YES (x, y). Since switch fabric tagging has begun, the variable SWITCH_INSERTS_TAGS=YES (x). From state CREATE VLAN state 305, the variable SWITCH_VLAN_TABLE=Vlan x, y.

Finally, in the SWITCH TAGGING state 307, wherein the switch fabric tags packets destined for the CPU with the particular VLAN numbers supplied by the user, the variable: SWITCH_INSERTS_TAGS=YES (x, y). Also the variable: CPU_INSERTS_TAGS=YES (x, y) and the variable: SWITCH_VLAN_TABLE=Vlan x, y.

As will be appreciated from the foregoing description, drawbacks of conventional segregated router-managed switch systems of the type described above are effectively obviated by the integrated router and switch fabric architecture of the present invention, which provides connectivity between local area network (LAN) ports serving a plurality of local area network users and a wide area network (WAN) port that connects to the internet, by having the router's control processor automatically create IEEE 802.1Q virtual local area network (VLAN) trunks in response to a reduced set of user command inputs. As pointed out above, the integrated router and switch fabric architecture of the invention has two essential aspects that differentiate it from the prior art. The first is the fact that it has no user-configurable physical link between the switch fabric and the router. Instead, a virtual IEEE 802.1Q trunk is created through software to provide connectivity between the switch fabric and the router's control processor. Secondly, this virtual IEEE 802.1Q trunk is automatically generated by the router's control processor when a VLAN interface is created, by the user initiating the configuration of a LAN-to-WAN connection from a particular VLAN. All traffic flowing over this link have VLAN tags appended to the frames as defined in accordance with IEEE 802.1Q protocol.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A system for providing packetized data traffic routing connectivity between user terminals of a local area network (LAN) and a wide area network (WAN) interface to an internet, said system comprising an integrated router and switch fabric architecture and comprising:

an Ethernet switch having a plurality of ports that are adapted to be coupled to said user terminals; and a processor and switch fabric coupled to said Ethernet switch and being operative to route packets from said Ethernet switch as sourced thereto from said user terminals to said processor for delivery to said WAN interface, and to route packets supplied thereto to said Ethernet switch for delivery via ports thereof to destination user terminals and said processor is connected between said switch fabric and WAN and further comprising a single motherboard on which the processor and switch fabric are positioned and a PCI bus interfacing the processor and switch fabric; and wherein connectivity between said processor and said switch fabric is established by way of a virtual trunk link therebetween without a user-configurable physical link, wherein said processors and said switch fabric are automatically configured by said processor in response to virtual LAN (VLAN) address-containing user commands to insert VLAN tags into frames of communication signals transported from said integrated router and switch fabric such that VLAN tags identify VLAN's for transport of communications signals, wherein a SWITCH VLAN table is loaded with a pair of VLAN entries (X and Y) and the processor includes SWITCH TAGGING states loaded with tag entries supplied by the user for determining VLAN tags to be inserted into frames of communication signals, and wherein user commands are used by said processor for updating a new VLAN and tagging packets with VLAN tags wherein requisite variables for tagging states are performed automatically from the processor.

2. The system according to claim 1, wherein said virtual trunk link is an IEEE 802.1Q VLAN trunk link.

3. A method of providing packetized data traffic routing connectivity between user terminals of a local area network (LAN) and a wide area network (WAN) interface to an internet using an integrated router and switch fabric architecture, said method comprising the steps of:

(a) interfacing a plurality of ports of an Ethernet switch with said user terminals;

(b) coupling said Ethernet switch to a switch fabric that is operative to route packets from said Ethernet switch as sourced thereto from said user terminals to a processor for delivery to said WAN interface, and to route packets supplied thereto to said Ethernet switch for delivery via ports thereof to destination user terminals, wherein said processor is connected between said switch fabric and LAN, and further comprising a single motherboard on which the processor and switch fabric are positioned and a PCI bus interfacing the processor and switch fabric;

(c) establishing connectivity between said processor-based router and said switch fabric by way of a virtual VLAN trunk link therebetween, wherein said processor and said switch fabric are automatically configured by said processor in response to virtual LAN (VLAN) address-containing user commands to insert VLAN tags into frames of communication signals transported from said integrated router and switch fabric such that VLAN tags identify VLAN's for transport of communications signals, wherein a SWITCH VLAN table is loaded with a pair of VLAN entries (X and Y) and the processor includes SWITCH TAGGING states loaded with tag entries supplied by the user for determining VLAN tags to be inserted into frames of communication signals, and wherein user commands are used by said processor for updating a new VLAN and tagging packets with VLAN tags wherein requisite variables for tagging states are performed automatically from the processor.

4. The method according to claim 3, wherein said virtual trunk link is an IEEE 802.1Q VLAN trunk link.

5. In a system for providing packetized data traffic routing connectivity between user terminals of a local area network (LAN) and a wide area network (WAN) interface to an internet, said system comprising an integrated router and switch fabric architecture and including an Ethernet switch having a plurality of ports that are adapted to be coupled to said user terminals, and a processor and a switch fabric coupled to said Ethernet switch and being operative to route packets from said Ethernet switch as sourced thereto from said user terminals to said processor for delivery to said WAN interface, and to route packets supplied thereto to said Ethernet switch for delivery via ports thereof to destination user terminals wherein said processor is connected between said switch fabric and LAN, and further comprising a single motherboard on which the processor and switch fabric are positioned and a PCI bus interfacing the processor and switch fabric;

wherein connectivity between said processor and said switch fabric is exclusive of a physical trunk link therebetween, and is established instead by way of an IEEE 802.1Q VLAN trunk link that is automatically configured in response to virtual LAN (VLAN) address-containing user commands; and wherein said processor and said switch fabric are automatically configured by said processor in response to virtual LAN (VLAN) address-containing user commands to insert VLAN tags into frames of communication signals transported from said integrated router and switch fabric such that VLAN tags identify VLAN's for transport of communications signals, wherein a SWITCH VLAN table is loaded with a pair of VLAN entries (X and Y) and the processor includes SWITCH TAGGING states loaded with tag entries supplied by the user for determining VLAN tags to be inserted into frames of communication signals, and wherein user commands are used by said processor for updating a new VLAN and tagging packets with VLAN tags wherein requisite variables for tagging states are performed automatically from the processor.

\* \* \* \* \*